June 28, 1927.
C. D. HART
1,633,592
METHOD OF AND APPARATUS FOR VULCANIZING MATERIAL
Original Filed Oct. 25, 1923
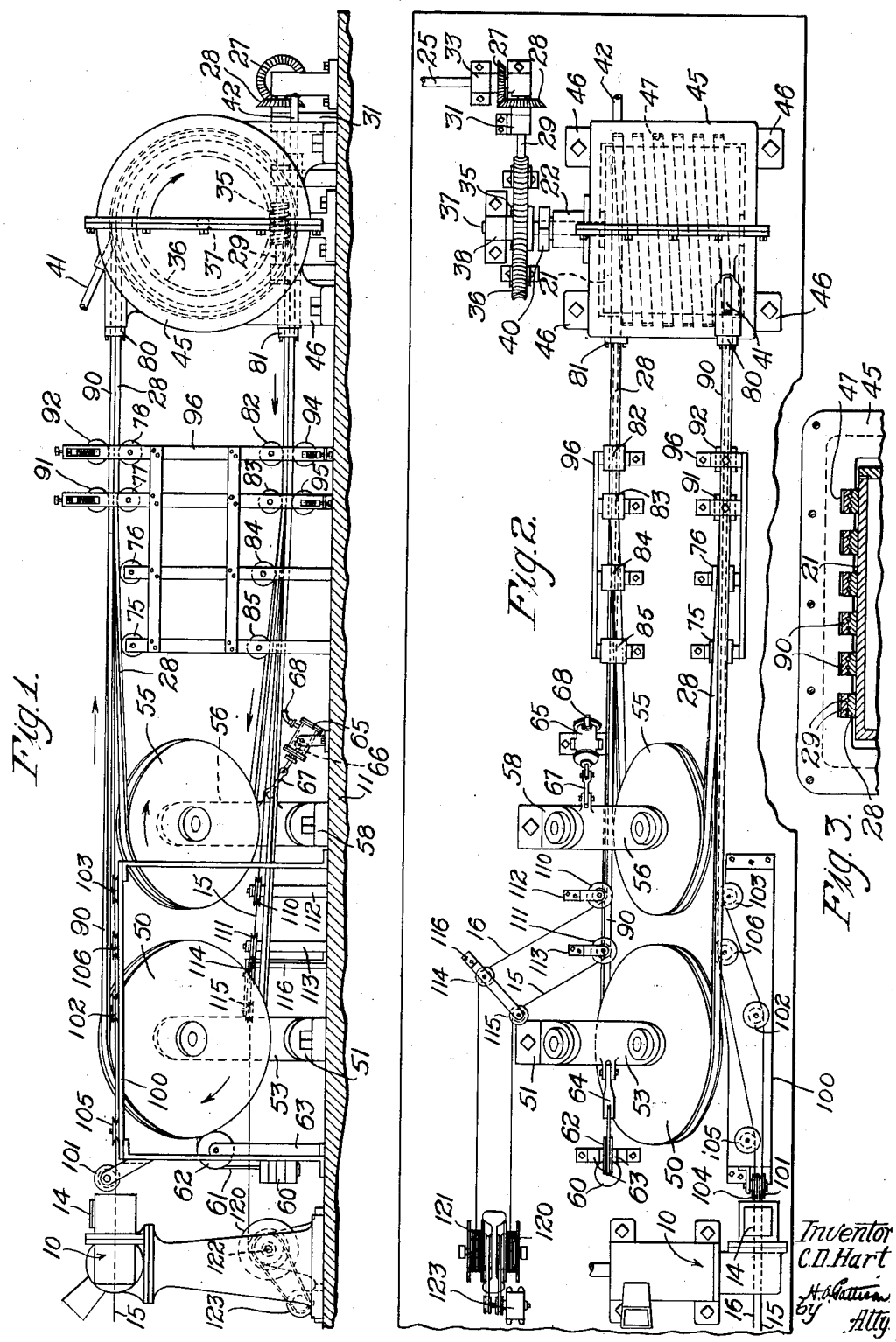
Inventor
C. D. Hart Patented June 28, 1927.

1,633,592

UNITED STATES PATENT OFFICE.

CARL DEMPSTER HART, OF LA GRANGE, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR VULCANIZING MATERIAL.

Application filed October 25, 1923, Serial No. 670,693. Renewed May 6, 1927.

This invention relates to methods of and apparatus for vulcanizing material, and more particularly to a method of and apparatus for vulcanizing a continuously moving length of material.

In the manufacture of wire or cable covered with vulcanized material, such as a rubber compound, it is desirable to make the process continuous from the application of the vulcanizable material to the completion of the vulcanization. This continuity of process obviates the necessity of handling the material between succeeding steps in the manufacture, thus cheapening and expediting the manufacture, as well as eliminates the possibility of irregularities in and injury to the material which might be introduced due to intermediate handling thereof, such as winding upon a reel. Such a process is particularly advantageous in the manufacture of rubber covered wires of cables if they are used as electrical conductors and wherein the vulcanized material constitutes an insulating sheath for the core. In instances of this nature, deformation of the material which might be occasioned by handling the sheathed core before the sheathing is properly vulcanized, may in some cases decrease the thickness of such sheath at some points along the core, thus materially lessening the insulation resistance of the sheath at such points.

It is an object of the invention to continuously vulcanize a moving strand of vulcanizable material by enclosing successive sections thereof in a continuous metal mold and passing the enclosed sections through a supply of steam.

Another object is to continuously feed vulcanizable material into a continuous metal mold, exerting a uniform unit pressure on the strand while traveling through a steam chamber.

A further object is to provide an apparatus for continuously vulcanizing strand material, wherein a pair of constantly moving endless metal mold belts cooperate to receive an encased strand of material, convey it to a steam chamber along a spiral path around a drum therein, and out of the chamber, the vulcanized strand being thereafter discharged from the belts.

An apparatus embodying the invention and by which the method may be practiced may comprise a rotating drum enclosed in a casing in the interior wall of which a spiral track is formed for guiding over the periphery of the drum a pair of flexible metal endless belts. One face of each belt is provided with a plurality of grooves which cooperate when the belts are brought into face to face engagement, and completely and individually enclose a plurality of wires or cables of vulcanizable material. The engaged belts serve to convey in a continuous sequence, successively adjacent sections of the wires into the casing, which contains steam, and over the periphery of the drum, thereby vulcanizing the rubber compound constituting the coverings or sheaths, and thereafter carry the covered wires out of the steam chamber. The belts thereupon disengage and the wires are wound on spools by a suitable take-up apparatus.

Other features of the invention will clearly appear from the following description and the accompanying drawings illustrating one embodiment of the apparatus which may be used in practicing the invention.

In the drawings,

Fig. 1 is a side elevation of the mechanism employed, directly associated with an extruding machine and take-up apparatus;

Fig. 2 is a plan view of the apparatus shown in Fig. 1, and

Fig. 3 is an enlarged fragmentary view, partially in section, of the rotating drum and the casing therearound.

Referring to the drawings in detail, in which like reference numerals designate similar parts throughout the various views, 10 represents an extruding machine of any ordinary type, such as may be used to extrude individual sheaths of rubber compound simultaneously around a plurality of wires or cables. Associated with the extruding machine and directly connected therewith is an air-tight chamber 14 containing powdered soapstone through which a plurality of sheathed wires or cables pass on their way to the vulcanizing apparatus.

A main line shaft 25, which may be driven from any suitable source of power (not shown) carries a beveled gear 27 which meshes with a beveled gear 28 carried upon the end of a shaft 29. The latter mentioned shaft is supported in a suitable bearing mounted in a bracket 31, while the former mentioned shaft is supported in a bearing mounted in a bracket 33. The shaft 29 also carries a worm 35 meshing with a worm wheel 36 which is secured in any well known manner to a shaft 37 attached to one head of a hollow drum 21 and rotatable within the bearing 38 suitably supported from the base 11 and the combination bearing and stuffing box 22 secured to the end of a casing 45 supported by a plurality of legs 46. A nut 40 may be used for compressing the packing material within the stuffing box 22. Thus when the main line shaft is operated, the drum 21 is caused to rotate. A rectangular groove 47 formed in the interior surface of the casing 45 forms a spiral track extending substantially from one end to the other end of the drum 21. A conduit 41 entering the casing near the top and at the left of the center line may be connected with any suitable source of steam for admitting steam to the space between the casing and the exterior of the drum, while a conduit 42 entering the casing near the bottom and the farther end provides a suitable drain for removing any condensation which takes place within the space. The casing 45 may be made in substantially similar halves suitably secured together by a plurality of screws located in flanges thereof.

A grooved idler pulley 55 is rotatably mounted upon one end of an extension arm 56, the other end of such arm being pivotally attached to an angular bracket 58. A somewhat similar idler pulley 50 is also mounted in a similar manner upon the free end of an extension arm 53, the other end of such arm being pivotally secured to an angular bracket 51. The angular position of the extension arm 56 and its associated pulley 55 with respect to the base member 11 is determined by a pneumatic cylinder 65 containing a piston 66 which is connected by means of a link 67 to the arm 56. A pipe or hose 68 serves to admit compressed air through any suitable source to the cylinder 65 and the pressure of such air against the face of the piston 66 serves to exert pressure against the arm 56. In a somewhat similar manner the angular relation of the arm 53 to the base member 11 is determined by a counterweight 60 attached to the end of a cable 61, which passes over a pulley 62 suitably supported by a pair of brackets 63 and is attached to a terminal 64 pivotally secured to the arm 53. By adjusting the pressure of the air admitted to the cylinder 65 and the mass of the counterweight 60, the positions of the arms 53 and 56 and pulleys 50 and 55 respectively may be adjusted. It will be noted that the brackets 51 and 58 are so designed that the tops of the pulleys 50 and 55 are both substantially in line with one end of the casing 45, while the bottoms of these pulleys are substantially in line with the other end of the casing.

An endless metal belt 28, having a plurality of semi-circular grooves 29 formed in one surface thereof traverses around the pulley 55, passes over idler pulleys 75, 76, 77 and 78 in sequence and enters the casing 45 through a stuffing box 80, engages the surface of the drum 21 and enters the track 47. This belt is then guided over the surface of the drum as the drum rotates around the track 47, disengaging from the drum at the bottom thereof and emerging from the casing 45 through a stuffing box 81. Thereafter it passes under idler rollers 82, 83, 84, and 85 and returns to the pulley 55, engaging this pulley at the bottom thereof. A similar endless metal belt 90 also having a plurality of grooves in one surface thereof, traverses around the pulley 50 under adjustable spring pressed pressure rolls 91 and 92, the under surface of the belt being brought into engagement with the upper surface of the belt 28 as it passes under these rolls, the latter belt being supported at these points upon the rollers 77 and 78. After leaving the roll 92 the belt 90 still in engagement with the belt 28 passes through the stuffing box 80 and enters the track 47, being guided around the drum to the other end of the casing, and leaves the casing through the stuffing box 81 still in engagement with the belt 28. The belt 90 then passes over spring pressed rollers 94 and 95 which are located in alignment with the idler rollers 82 and 83 respectively, under which the belt 28 is passing. The belt 90 after leaving the pressure roll 95 returns to the pulley 50 at the bottom thereof. The pulleys 75, 76, 77, 78, 82, 83, 84, 85, 91, 92, 94, and 95 are all supported from the base 11 by a framework designated generally by the character 96. A framework 100 also supported upon the base member 11 carries a series of rollers 101, 102 and 103 for guiding the sheathed and coated strand 15 from the chamber 14 to one of the metal molds formed by the registration of corresponding semi-circular grooves in belts 28 and 90. This framework 100 also supports a similar set of rollers 104, 105, and 106 for guiding the sheathed and coated strand 16 from the chamber 14 to the other continuous metallic mold formed by the registration of the other semi-circular grooves in the belts 28 and 90. The exact registration of these semi-circular grooves in the belts 28 and 90 is insured by means of cooperating shoulders formed in the engaging faces of such belts. Rollers 110 and 111 mounted upon brackets 112 and 113 respectively, supported from the base member 11, cooperate with rollers 114 and 115 carried by a bracket 116 also supported upon the base member 11 to direct the vulcanized strands 15 and 16 after they are delivered from the belts 28 and 90 to suitable take-up spools 120 and 121 respectively. The take-up spools or reels 120 and 121 are mounted upon a common shaft 122 which may be rotated in any suitable manner, such as by a motor 123. The rollers supported by the framework 96 are provided for gradually and positively bringing the belts 28 and 90 into exact face to face engagement before they pass through the stuffing box 80 and to maintain them in such engagement to a point sufficiently beyond the stuffing box 81 so that there is no strain introduced thereon due to the slight twisting in these belts which is introduced due to the angular relation of the pulleys 50 and 55. In this manner the efficiency of the stuffing boxes 80 and 81 is insured at all times, and furthermore the rolls 75, 76, 84 and 85 tend to more gradually reduce the tendency to twist these belts.

In the operation of the device, a plurality of wires, cables or other electrical conductors, such as 15 and 16, may be fed through the extruding machine 10, which surrounds each of them with a sheathing of rubber compound, and from thence they pass through the chamber 14 where they are coated with powdered talc, soapstone, or other similar material to overcome any tendency for the compound to readily adhere to surfaces with which it may come in contact before it is thoroughly vulcanized. The sheathed and coated strands are then carried in engagement with the pulleys 101, 102, 103, 104, 105, and 106 respectively, which direct them into the molds formed by the cooperating semi-circular grooves in the belts 28 and 90 as these belts are brought into engagement by means of the rollers 75, 76, 77, 78, 91, and 92. The belts 28 and 90 in engagement with each other then enter the casing 45 through the stuffing box 80 and move across the periphery of the drum 21, being guided in a spiral path thereover by the track 47 formed in the interior of the casing 45. The temperature of the steam introduced through the conduit 41 and the length of the track 47 are such as to insure proper vulcanization of the rubber compound sheath around the strands 15 and 16 while they travel between the two belts which are in direct contact with the steam within this space. The belts are maintained in engagement as they pass through the stuffing box 81 and between the pairs of rollers 82, 94, 83 and 95, but the belt 28 is then carried into engagement with the rollers 84 and 85 which serve to direct it to the pulley 55, while the belt 90 is carried directly to its associated pulley 50. As the belts separate, the wires covered with the vulcanized sheathing are fed over the rollers 113, 115, 110 and 114 respectively to the take-up spools 120 and 121.

Although only two strands, 15 and 16, are shown, it is evident that any desired number of strands may be employed, only two strands having been shown in the present embodiment in order to simplify the disclosure.

It will be noted that the conduit 41 enters the casing 47 substantially in line with the beginning of the track 47 so that the steam introduced through this conduit is directed against the engaged belts carrying the strands to be vulcanized, substantially as it enters the casing. Furthermore, the conduit 42 is placed substantially in line at the other end of the casing with the other end of the track 47. In this manner a circulation of the steam is introduced along substantially the same path traveled by the belts.

What is claimed is:

1. A method of vulcanizing strand material, which consists in continuously feeding a strand into an endless mold, and thereafter continuously passing the mold through a supply of steam to vulcanize the strand.

2. A method of vulcanizing strand material, which consists in continuously feeding a strand into an endless mold, and thereafter conveying the mold into, through and out of a supply of steam, thereby vulcanizing the strand.

3. A method of vulcanizing strand material, which consists in continuously feeding a strand into an endless mold, conveying the mold containing the strand into, through and out of a supply of steam, and then continuously removing the vulcanized strand from the mold.

4. A method of vulcanizing strand material, which consists in feeding a strand into a constantly moving endless metal mold, and guiding the mold through a supply of steam.

5. A method of vulcanizing strand material, which consists in feeding a strand into a constantly moving endless metallic envelope, and guiding the envelope through a supply of steam.

6. In a vulcanizing apparatus, an enclosure containing steam, means for enclosing the strand material within an endless metallic envelope, and means for moving the envelope through the enclosure to vulcanize the enclosed strand.

7. In a vulcanizing apparatus, an enclosure containing steam, a pair of moving endless belts cooperating to engage strand material, convey it through the enclosure to vulcanize the strand, and to thereafter discharge the vulcanized strand.

8. In a vulcanizing apparatus, a rotating drum having a spiral track therearound, an enclosure surrounding the drum and containing steam, and a conveyor for continuously conveying strand material into the enclosure, over the spiral track and out of the enclosure, thereby vulcanizing the strand.

9. In a vulcanizing apparatus, an enclosure containing steam, a conveyor for conveying strand material into, through and out of the enclosure, thereby vulcanizing the material, and means for guiding the conveyor in a spiral path within the enclosure.

10. In a vulcanizing apparatus, an enclosure containing steam, a conveyor for conveying strand material into, through and out of the enclosure for vulcanizing the strand, means for guiding the conveyor in a spiral path within the enclosure, and means outside of the enclosure for withdrawing the vulcanized strand from the conveyor and for storing the vulcanized strand.

In witness whereof, I hereunto subscribe my name this 11th day of October, A. D., 1923.

CARL DEMPSTER HART.